US005679956A

United States Patent [19]

Johnston

[11] Patent Number: 5,679,956
[45] Date of Patent: Oct. 21, 1997

[54] ENHANCED VEHICLE RADIATION MONITORING SYSTEM AND METHOD

[75] Inventor: Joseph G. Johnston, Newbury, Ohio

[73] Assignee: Saint-Gobain/Norton Industrial Ceramics Corporation, Worcester, Mass.

[21] Appl. No.: 422,553

[22] Filed: Apr. 14, 1995

[51] Int. Cl.⁶ .................................................. G01T 1/167
[52] U.S. Cl. .................................. 250/357.1; 250/359.1; 250/394
[58] Field of Search ........................... 250/336.1, 357.1, 250/358.1, 359.1, 394

[56] References Cited

U.S. PATENT DOCUMENTS 5,135,706  8/1992  Costes et al. ................... 250/394 X

*Primary Examiner*—Edward J. Glick
*Attorney, Agent, or Firm*—Volker R. Ulbrich; Don W. Bulson

[57] ABSTRACT

A radiation detection system and method for scanning an object for ionizing radiation are generally characterized by at least one radiation detector which provides an output related to the level of ionizing radiation impinging thereon, a sensing device which evaluates and provides an output related to a shape characteristic of an object being scanned by the radiation detector, and a processor operatively connected to the radiation detector and sensing device for processing the outputs thereof. The output of the sensing device is used to compensate for variations in ambient background level arising from the sensed shape characteristic of the object. With such a system, the possibility of a geometry induced false alarm is minimized. In a preferred embodiment adapted for dynamic vehicle monitoring, the sensing device is a level detector operative to detect the level of the material in a truck or rail car passing by the radiation detector or detectors. The processor is operatively connected to the radiation detector and level detector for issuing an alarm signal upon satisfying a predetermined criteria, the processor being operative to use the output of the level detector to compensate the output of the radiation detector for variations in the background level arising from differences in the level of the material. The foregoing enables maximum sensitivity to be maintained while eliminating or reducing false alarms arising from variations in scrap loads that otherwise might have triggered a false alarm in previously used systems.

16 Claims, 3 Drawing Sheets

ENHANCED VEHICLE RADIATION MONITORING SYSTEM AND METHOD

The invention herein described relates generally to the field of radiation monitoring and, more particularly, to improvements in radiation monitoring systems for trucks or rail cars carrying scrap metal.

BACKGROUND

The inadvertent radioactive contamination of scrap metals, such as steel, aluminum, lead and copper, has become a significant problem. Since 1983, there have been a number of reported incidents in which radioactive material or radioactive material containers have been found in steel scrap, melted in a steel making facility, or contained in slag or other bi-products of the steel making or aluminum manufacturing process. High decontamination costs have been encountered in those plants unfortunate enough to have melted radioactive material. A radioactive contamination incident can have disastrous effects in steel making and scrap processing facilities.

Scrap metal may become contaminated in several ways. The scrap metal may be contaminated with loose radioactive material. The scrap metal may be material that was made radioactive by a high energy particle accelerator or nuclear reactor. Radioactive materials may have alloyed with iron or steel during manufacture of the iron or steel. Shielded or unshielded radioactive sources may be mixed with pieces or scrap. Shielded radioactive sources, such as those used in gauging devices and medical instruments, are perhaps the most difficult to detect in the waste stream.

From the standpoint of a foundry which uses scrap metal in its metal processing operations, for a number of reasons it is desirable to monitor scrap metal for radioactive contamination at its point of entry into the facility. If contaminated scrap is discovered, it can then be rejected and turned away. The most common location for a monitoring system is the weigh scale over which trucks or rail cars pass when bringing scrap into the facility. Unfortunately, a shielded radioactive source in a load of scrap metal may be covered by several feet of scrap metal, making the detection of the shielded source difficult and, in some cases, impossible. However, the ability to detect a buried shielded source is enhanced by improving the sensitivity of the mounting system.

Heretofore, dynamic vehicle monitoring systems have used radiation detectors large enough to cover the full height of the scrap contained in the vehicle being scanned. In a typical system, one or more radiation detectors, each using a large volume plastic scintillator, are located on opposite sides of the vehicle path. Also, additional detectors may be located above and/or below the vehicle path. As the vehicle moves through the region bounded by the radiation detectors, the passage of the vehicle is sensed by proximity sensors which initiate a scanning operation and also provide a basis for calculation of the vehicle's speed. The detectors and proximity sensors are connected to a control unit wherein the output signals of the detectors and sensors are processed and the resultant data analyzed for vehicle speed and vehicle radiation level.

Known vehicle monitoring systems also have employed background subtraction to take into account the background shielding produced by the vehicle and the metal scrap contained therein. A standard background subtraction system would place the alarm level a predetermined amount, for example 5 sigma (1 sigma equals 1 standard deviation), above the natural background to account for normal fluctuations in natural background. In these systems, however, a radioactive source would go undetected unless it produced enough radiation to overcome the background reduction caused by the vehicle's presence plus the standard 5 sigma alarm setting. In order to provide a more sensitive system, the reduction in background caused by the presence of the vehicle has been used to provide a base-line adjustment of the natural background level, with the alarm being set at 5 sigma above the reduced background.

Obviously, increased sensitivity could be accomplished by reducing the alarm level, for example to one or two sigma above the background level or the reduced background level. However, this would increase the probability of a false alarm and this presents a set of problems of its own. When a system alarms, the monitoring facility does not know if it is false alarm, a nuisance source that involves no threat, a very small shielded source near the surface of the scrap, a shielded source buried in the scrap, or a decayed but still sufficiently large activity source in its original shield. All can cause the same intensity reading in a detection system. Until otherwise determined, the alarm usually will be assumed to be real and to indicate that the source presents a potential personnel hazard in terms of external exposure and radioactive contamination, with attendant concerns.

SUMMARY OF THE INVENTION

The present invention provides improvements in existing dynamic vehicle monitoring systems which enable maximum sensitivity to be maintained while eliminating or reducing false alarms arising from variations in scrap loads that otherwise might have triggered a false alarm in previously used systems. More particularly, the application of the principles of the present invention eliminate false alarms that previously arose from non-uniform loads of scrap metal. More generally, the present invention provides an improved radiation detection system and method which takes into account background variations arising from differences in the geometry of the object being scanned.

According to one aspect of the invention, a radiation detection system and method for scanning an object for ionizing radiation are generally characterized by at least one radiation detector which provides an output related to the level of ionizing radiation impinging thereon, a sensing device which evaluates and provides an output related to a shape characteristic of an object being scanned by the radiation detector, and a processor operatively connected to the radiation detector and sensing device for processing the outputs thereof. The output of the sensing device is used to compensate for variations in ambient background level arising from the sensed shape characteristic of the object. With such a system, the possibility of a geometry induced false alarm is minimized.

In a preferred embodiment, a radioactive material detection system for scanning material for radioactive objects comprises at least one radiation detector on which ionizing radiation can impinge to induce a detector output related to the level of such impinging ionizing radiation, a level detector and a processor. The radiation detector is configured for passage thereby of the material to be scanned, the radiation detector being sensitive to background radiation that is at least partially shielded by the material as the material is being passed thereby, and the radiation detector being operative to provide an output indicative of incident background radiation and any incident radiation arising from a radioactive object in the material as the material is passed by the radiation detector. The level detector is operative to detect the level of the material passing by the radiation detector and provide an output representative of such level, and the processor is operatively connected to the radiation detector and level detector for issuing an alarm signal upon the outputs of the radiation and level detectors satisfying a predetermined criteria. According to the invention, the processor is operative to use the output of the level detector to compensate the output of the radiation detector for variations in the background level arising from differences in the level of the material.

The level detector preferably includes at least one distance measuring device that may be positioned in relation to the scan area such that it is operative to determine the level of the object passing through the scan area relative to a base line. As is preferred for dynamic vehicle monitoring, the distance measuring device is located above the scan area and downwardly aimed to detect the level of material in an open top vehicle.

According to another aspect of the invention, a method of scanning for a load of material for radioactive substances comprises the, steps of passing a load of material to be scanned past a radiation detector, the radiation detector being exposed to background radiation when the load of material is not being passed thereby and the background radiation being at least partially shielded by the load of material when the load of material is being passed thereby, the detector providing an output indicative of incident background radiation and any incident radiation arising from a radioactive substance in the load of material; using a level detector to measure the level of the load of material along the length thereof; and using a processor to process the outputs of the radiation detector and level detector, the processing step including the steps of using the output of the level detector to compensate the output of the radiation detector for variations in the background level arising from differences in the level of the material and issuing an alarm upon the compensated output of the radiation detector satisfying a predetermined criteria. The material may be carried in a truck or rail car moving past the detector.

The foregoing and other features are hereinafter described and particularly pointed out in the claims, the following description and the annexed drawings setting forth in detail an illustrative embodiment of the invention, this being indicative, however, of but one of the various ways in which the principles of the invention may be employed.

DETAILED DESCRIPTION

Figure 1:
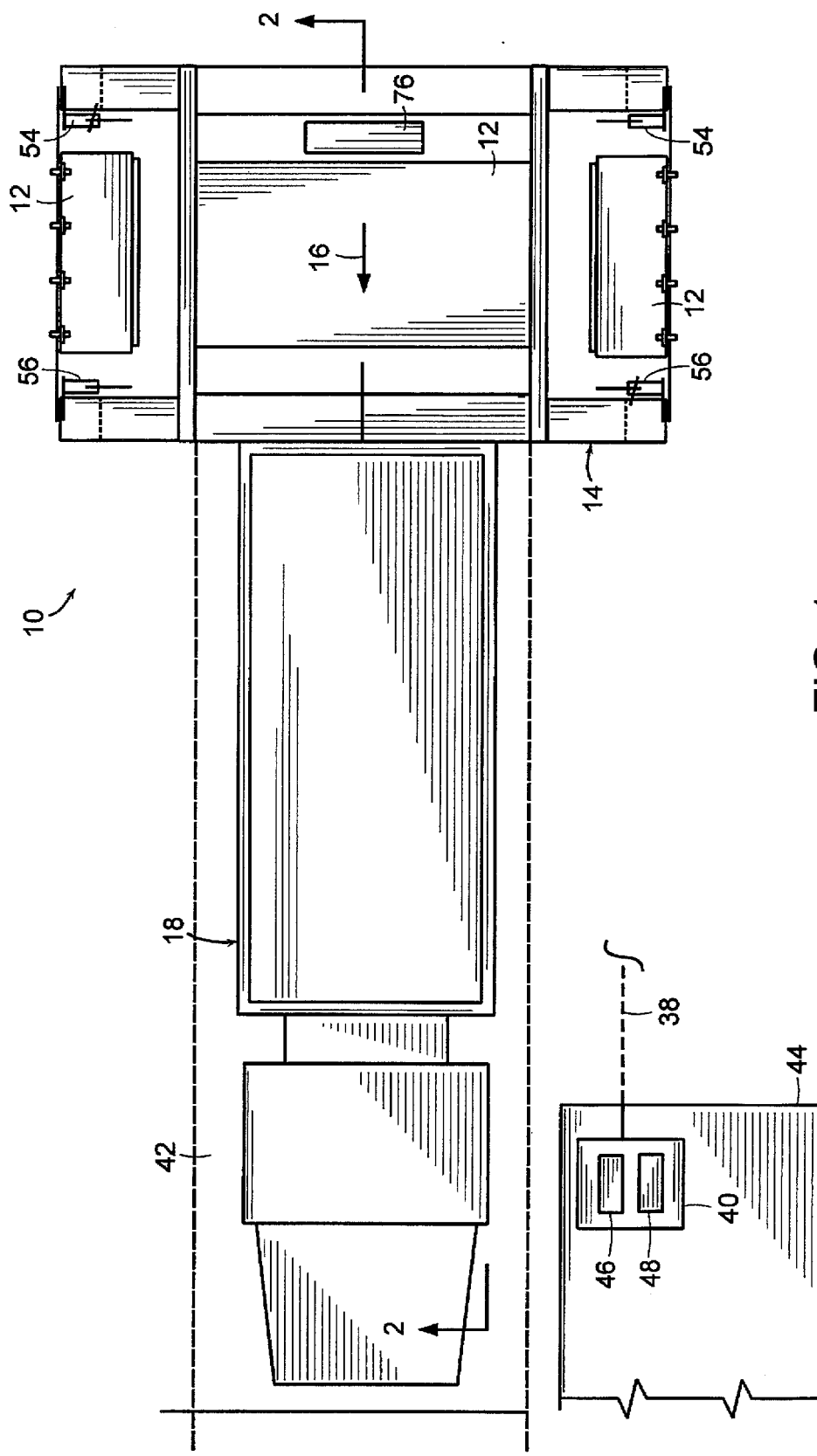
FIG. 1 is a top plan view of a radioactive material detection system according to the invention.
Figure 2:
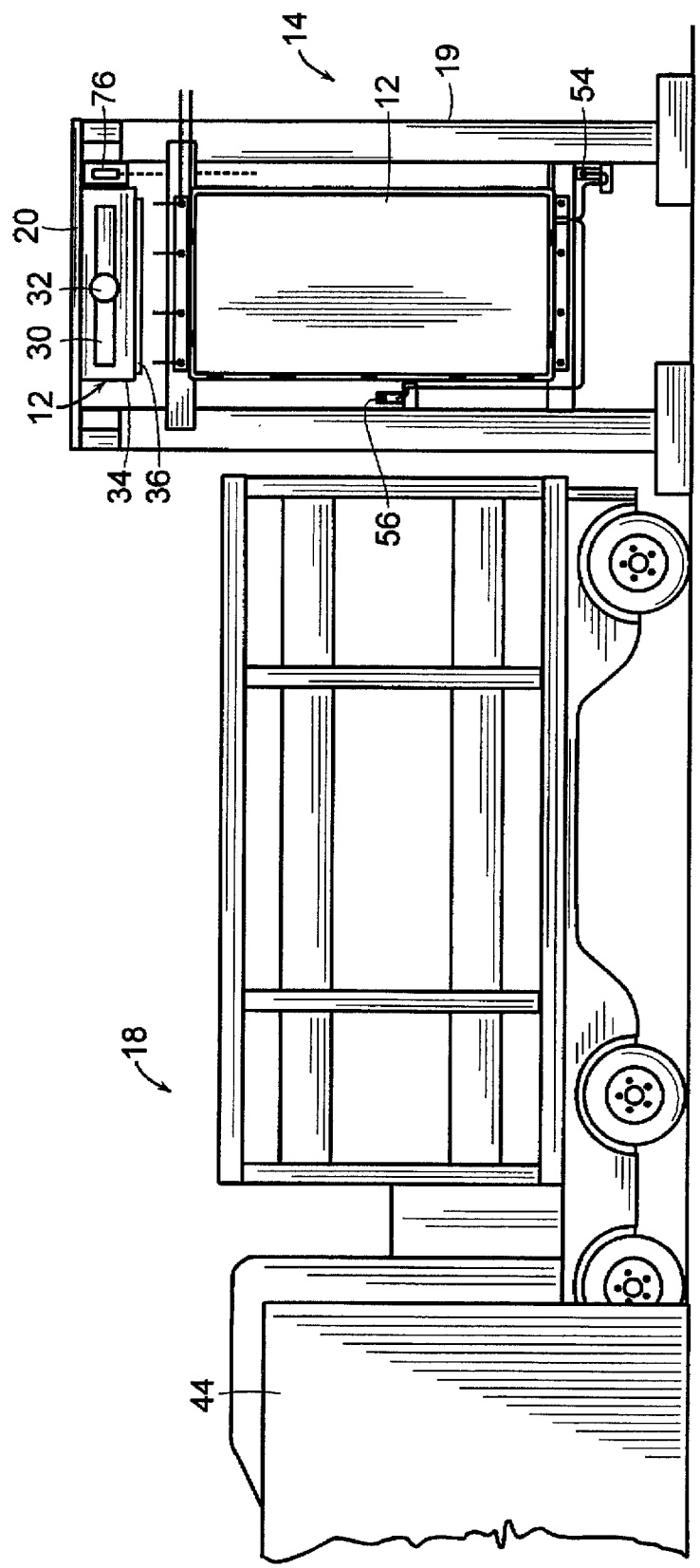
FIG. 2 is a cross-sectional view of the system of FIG. 1, taken substantially along the line 2—2 thereof.

Referring now in detail to the drawings and initially to FIGS. 1 and 2, a radioactive material detection system according to the invention is designated generally by reference numeral 10. The system 10 comprises one or more radiation detectors 12 for detecting various types of ionizing radiation including, for example, $^{60}$Co, $^{137}$Cs, $^{192}$Ir, $^{226}$Ra/Th and other medium and high energy gamma-emitting isotopes, and neutrons. In the illustrated embodiment, three radiation detectors 12 are mounted to a support structure 14 for disposition at opposite sides and above a pathway for an object to be scanned for radioactivity. The illustrated system 10 is particularly adapted for dynamic scanning of scrap metal (although useful for scanning other materials for radioactivity) as the material is being carried by a vehicle along the pathway indicated by arrow 16. In a typical application, the scrap metal is carried by an open top truck or rail car, a truck being depicted at 18 for illustrative purposes. The following discussion will be made in relation to the transport of the metal scrap or other material by a truck, but it will be appreciated that this description is equally applicable to a rail car and, more generally, to other means of conveyance.

The illustrated support structure 14 has an inverted U-shape with the legs 19 thereof straddling the vehicle pathway 16. Each leg 19 has a radiation detector 12 mounted thereto, and a third radiation detector is mounted to overhead structure 20 extending between the upper ends of the legs 19. A fourth detector (not shown) may be provided beneath the vehicle pathway, and additional side, top and bottom detectors may be provided for redundancy as may be desired. The detectors collectively define therebetween a scan area through which the object or material can pass for scanning by the detectors. If only a single detector is used then the scan area is the region in front of the detector through which the object or material passes for scanning by the detector.

Each radiation detector 12 preferably comprises a large volume plastic scintillator 30 coupled to a low noise photomultiplier tube 32. The plastic scintillator 30 and photo multiplier 32 are contained in a weatherproof housing 34 having a hinged front door 36 for access to the plastic scintillator, photomultiplier tube, and other internal components including signal-processing electronics associated with the photomultiplier tube. The plastic scintillators are shielded by lead on all sides except the door which serves as the radiation entrance window. The shield provides background reduction and improved directional response. The door or radiation entrance window is oriented so as to face the vehicle path preferably with the plane of the door, or more particularly the plane of the plastic scintillator, disposed perpendicular to the adjacent side wall or top of the truck or other vehicle which carries the scrap metal or other material to be scanned. An exemplary radiation detector is sold by Bicron Industrial Ceramics Corporation of Newbury, Ohio, USA, under Model No. BC-408.

The radiation detectors 12 are connected by suitable means such as cabling 38 to a control unit 40. In a typical installation such as that illustrated, wherein the detector system is provided in association with a scale 42 for weighing the vehicle, the control unit 40 may be conveniently housed in the scale house 44. The control unit preferably includes a processor 46, such as a suitably programmed microprocessor-based computer, and may have interfaced therewith various input/output devices 48 such as a display, keyboard, modem, printer, alarm devices, etc. Exemplary control units are employed in radiation material detection systems sold by the aforesaid Bicron division.

The detection system 10 further comprises leading and trailing proximity sensors 54 and 56 for detecting the presence of the vehicle in the area surrounded by the radiation detectors 12 and for providing a means by which the speed of the vehicle may be calculated. The proximity sensors may be of any suitable type such as the illustrated paired photocells mounted to the support structure at opposite sides of the vehicle pathway 16. When a vehicle moves between the detectors the beam between the paired photocells is broken to initiate monitoring of the vehicle for radiation. Also, the difference in time between breaking of the upstream beam of sensor 54 and downstream beam of sensor 56 is used for calculating the speed of the vehicle. As is preferred, an alarm is initiated by the control unit 40 if the vehicle exceeds a specified speed such as 5 miles per hour, as higher speeds decrease the sensitivity of the detection system.

The processor 46 receives the output signals from the radiation detectors 12 and the proximity sensors 54 and 56 and uses the accumulated data to calculate the speed of the vehicle as above mentioned and to issue an alarm if the calculated speed exceeds a predetermined limit or if detected radiation exceeds a predetermined level.

In order to detect shielded sources or other radioactive substances having low exposure rates such as below natural background, the processor 46 should be able to alarm below natural background levels to account for the natural shielding produced by the vehicle in front of the radiation detectors. To accomplish this a prior art practice has been to determine the reduction in background caused by the truck when the detectors are fully overlapped by the leading end of the truck. The alarm level is then set at a predetermined amount, such as 5 sigma, above the reduced background. This provides an increase in sensitivity several times greater than the sensitivity of systems where the alarm level is set at 5 sigma above the natural background level assuming about a 20% reduction in background level caused by the vehicle's presence.

The system as thus far described finds correspondence in the prior art. With such a system, whether or not background substraction is applied, a false alarm may arise from non-uniform scrap loads, as where the level of the material varies along the length of the vehicle or other carrier. As the amount of background shielding will vary with the level of the material, the background radiation detected by the radiation detectors will correspondingly vary. Because of this variance along the length of the vehicle, the increase in measured background radiation may be mistaken by the system as a radiation source buried in the load of material, with the result being a false alarm.

Figure 3:
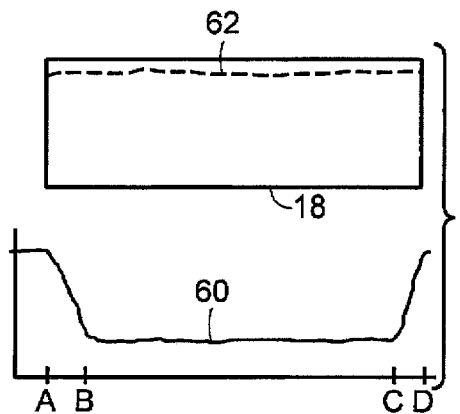
FIG. 3 shows an exemplary radiation profile of a uniform scrap load.
Figure 4:
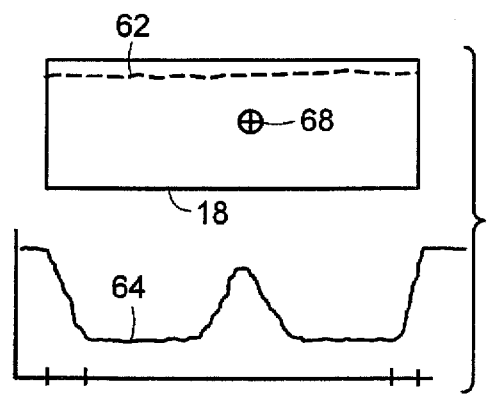
FIG. 4.shows an exemplary radiation profile of a uniform scrap load including a buried source of radiation.
Figure 5:
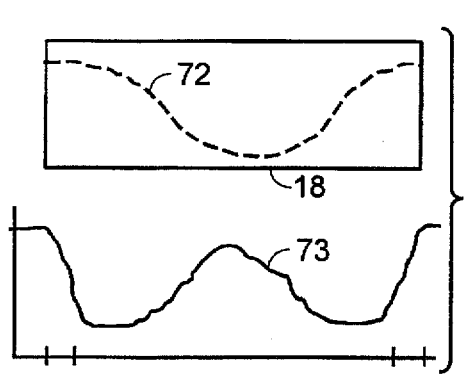
FIG. 5 shows an exemplary radiation profile of a non-uniform scrap load without scrap depth compensation.

This is illustrated in FIGS. 3–5. In FIG. 3, an exemplary radiation profile produced by one of the radiation detectors for a uniform scrap load 62 in a truck is shown at 60, with the ordinate indicating radiation exposure rate and the abscissa indicating time. The time scale is related to positions along the length of the truck, the point "a" corresponding to the first or upstream proximity sensor 54 being tripped by the presence of the vehicle, the point "b" corresponding to the second or downstream proximity sensor 56 being tripped by the presence of the vehicle and indicating that the detector is overlapped to its maximum extent by the vehicle, the point "c" corresponding to untripping of the first proximity sensor 54 upon passage of the vehicle therebeyond, and the point "d" corresponding to untripping of the second proximity sensor 56 at which point the detector are no longer overlapped by the vehicle.

As depicted in FIG. 3, the radiation profile ramps down as the leading end of the truck (more particularly the material containing portion of the truck) moves in front of the detector and progressively shields the detector from background radiation. The exposure rate then levels out at a reduced background level while the detector remains fully overlapped by the truck with the uniform load providing substantially uniform shielding of natural background. It of course will be appreciated that the detected radiation level may vary if the "as loaded" density or radiation stopping power of the load of material is nonhomogeneous. However, scrap loads carried by trucks and rail cars usually are of the same type of scrap, such as cut up plate, shredded scrap, crushed car bodies, etc., and consequently are relatively homogeneous over the scan distance. Moreover, this may be made a requirement to ensure high detectability of shielded sources.

In FIG. 4, there is shown an exemplary radiation profile 64 for the uniform scrap load 62 of FIG. 3, except that it now contains a buried radiation source 68. As depicted, the radiation profile 64 ramps down like before as the leading end of the truck moves in front of the detector and progressively shields the detector from background radiation. The exposure rate then levels out at a reduced background level until the buried source 68 moves in front of the detector at which point the detected radiation level will rise and then fall as the source moves past the detector. If the radiation level is sufficiently high, such as 5 sigma above the reduced background radiation level, an alarm is issued by the processor 46.

FIG. 5 shows what might arise from a load 72 of material free of a radiation source, but which is non-uniform as where the material is piled high at the front and back of the truck or rail car 18 and low in the middle. The resultant radiation profile 73 will exhibit a peak at the lowest level of the material, which peak may look like the peak corresponding to the radiation source in FIG. 4 with the system issuing an alarm. However, in this instance, the alarm would be a false alarm.

Figure 6:
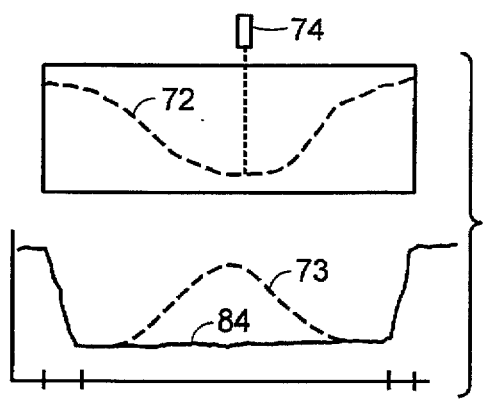
FIG. 6 shows an exemplary radiation profile of the non-uniform scrap load of FIG. 5, but with scrap depth compensation according to the present invention.

The present invention solves this problem of a geometry induced false alarm by providing a means for sensing the level of material in the vehicle or, more generally, the shape of the object being scanned, so that compensation can be made for the variation in background shielding that arises from changes in the geometry of the material moving past the detector. In the illustrated embodiment the shape sensing mechanism, depicted at 74 in FIG. 6, is any suitable device for sensing the level or height of the material along the length of the vehicle. For example, and with reference to FIGS. 1 and 2, the mechanism 74 may include a distance measuring device 76 mounted to the support structure 14 above the vehicle pathway in an appropriate housing for looking down through the open top of the vehicle. Any suitable distance measuring device may be employed such as an infrared laser diode based rangefinder, an ultrasonic rangefinder, etc. A rangefinder will output a signal representative of a distance relative to a base line which in the present case is fixed and from which the height or level of material in the vehicle can be determined. As will be appreciated, the distance measuring device or devices may be used not only to monitor the height of the material but also as vehicle presence detectors, thereby potentially eliminating the need for the above mentioned proximity sensors.

With knowledge of the level of the material positioned in front of the detector at a given instance, the detected radiation level can be adjusted by the processor 46 to compensate for the variation in scrap depth. This is illustrated in FIG. 6, where the uncompensated radiation profile 73 of FIG. 5 is compared to the radiation profile 84 compensated for scrap depth. The programming of the processor 46 to carry out the scrap depth compensation will depend on the particular programming used to carry out the other operations of the processor and is well within the skill of the ordinary programmer in the art.

Although the invention has been shown and described with respect to a certain preferred embodiment and variations thereof, equivalent alterations and modifications will no doubt occur to others skilled in art upon the reading and understanding of this specification. The present invention includes all such equivalent alterations and modifications, and is limited only by the scope of the following claims.

I claim:

1. A radiation detection system for scanning an object for ionizing radiation, comprising at least one radiation detector which provides an output related to the level of ionizing radiation impinging thereon, a sensing device which evaluates and provides an output related to a shape characteristic of an object being scanned by the at least one radiation detector, and a processor operatively connected to the at least one radiation detector and sensing device for processing the outputs thereof, the output of the sensing device being used to compensate for variations in the level of background radiation resulting from variations in the shape characteristic of the object;

said at least one radiation detector being directed toward a scan area through which the object can move for scanning by said at least one radiation detector;

said sensing device being positioned in relation to said scan area such that it is operative to determine the height of the object passing through said scan area relative to a base line.

2. A system as set forth in claim 1, wherein said sensing device is located above the scan area and downwardly aimed to detect the height of the object in an open top vehicle.

3. A system as set forth in claim 2, wherein said sensing device includes at least one distance measuring device.

4. A radiation detection system for scanning an object for ionizing radiation, comprising at least one radiation detector which provides an output related to the level of ionizing radiation impinging thereon, a sensing device which evaluates and provides an output related to a shape characteristic of an object being scanned by the at least one radiation detector, and a processor operatively connected to the at least one radiation detector and sensing device for processing the outputs thereof, the output of the sensing device being used to compensate for variations in level of background radiation resulting from variations in the shape characteristic of the object;

said sensing device being positioned in relation to a scan area in front of said at least one radiation detector such that it is operative to determine the height of the object passing through said scan area relative to a base line.

5. A system as set forth in claim 4, wherein said sensing device is located above the scan area and downwardly aimed to detect the height of the object in an open top vehicle.

6. A radioactive material detection system for scanning material for radioactive objects, comprising at least one radiation detector on which ionizing radiation can impinge to induce an output related to the level of such impinging ionizing radiation, the at least one radiation detector being configured for passage thereby of the material to be scanned, the at least one radiation detector being sensitive to background radiation that is at least partially shielded by the material as the material is being passed thereby, and the at least one radiation detector being operative to provide an output indicative of incident background radiation and any incident radiation arising from a radioactive object in the material as the material is passed by the at least one radiation detector, a height detector operative to detect the height of the material passing by the at least one radiation detector and provide an output representative of the height, a processor operatively connected to the at least one radiation detector and height detector for issuing an alarm signal upon the outputs of the at least one radiation detector and the height detector satisfying a predetermined criteria, the processor being operative to use the output of the height detector to compensate the output of the at least one radiation detector for variations in the level of background radiation resulting from differences in the height of the material.

7. A system as set forth in claim 6, wherein said at least one radiation detector comprises a plurality of radiation detectors disposed on respective sides of a scan area through which the material can move for scanning by said radiation detectors.

8. A system as set forth in claim 7, wherein said height detector includes at least one distance measuring device.

9. A system as set forth in claim 8, wherein said at least one distance measuring device is positioned in relation to said scan area such that it is operative to determine the height of the material passing through said scan area relative to a base line.

10. A system as set forth in claim 9, wherein said distance measuring device is located above the scan area and downwardly aimed to detect the height of the material in an open top vehicle.

11. A method of scanning for a load of material for radioactive substances, comprising the steps of:

passing a load of material to be scanned past a radiation detector, the radiation detector being exposed to background radiation when the load of material is not being passed thereby and the background radiation being at least partially shielded by the load of material when the load of material is being passed thereby, the radiation detector providing an output indicative of incident background radiation and any incident radiation arising from a radioactive substance in the load of material, using a height detector to measure the height of the load of material along the length thereof, and using a processor to process the outputs of the radiation detector and the height detector, said processing step including the steps of using the output of the height detector to compensate the output of the radiation detector for variations in the level of background radiation resulting from differences in the height of the material and issuing an alarm upon the compensated output of the radiation detector satisfying a predetermined criteria.

12. A method as set forth in claim 11, wherein said using a height detector step includes using at least one distance measuring device.

13. A method as set forth in claim 12, wherein the at least one distance measuring device is positioned in relation to a scan area in front of the radiation detector such that it is operative to determine the height of the material passing through said scan area relative to a base line.

14. A method as set forth in claim 13, wherein the at least one distance measuring device is located above the scan area and downwardly aimed to detect the height of material in an open top vehicle.

15. A method as set forth in claim 11, wherein the material is carried in a truck moving past the radiation detector.

16. A method as set forth in claim 11, wherein the material is carried in a rail car moving past the radiation detector.

* * * * *